(12) United States Patent
Mabit (10) Patent No.: US 7,201,343 B2
(45) Date of Patent: Apr. 10, 2007

(54) CARRIER-LESS PATCH PROTECTION INCLUDING CASSETTE AND SEPARATION DEVICE

(75) Inventor: Stephane Mabit, La Chapelle Saint Sauveur (FR)

(73) Assignee: ZIH Corp., Hamilton (BM)

( * ) Notice: Subject to any disclaimer, the term of this patent is extended or adjusted under 35 U.S.C. 154(b) by 96 days.

(21) Appl. No.: 10/328,288

(22) Filed: Dec. 23, 2002

(65) Prior Publication Data

US 2003/0085249 A1    May 8, 2003

Related U.S. Application Data

(62) Division of application No. 09/827,646, filed on Apr. 6, 2001, now abandoned.

(51) Int. Cl.
*B65H 23/188*    (2006.01)

(52) U.S. Cl. ............... 242/419.5; 242/419.8; 242/566; 242/564.4; 242/588.3; 242/348

(58) Field of Classification Search ......... 242/566, 242/564.4, 557, 588, 588.3, 588.6, 597, 590, 242/419.5, 419.8, 419.9, 348; 225/100, 115
See application file for complete search history.

(56) References Cited

U.S. PATENT DOCUMENTS

| | | | |
|---|---|---|---|
| 803,574 A | 11/1905 | Pancher | |
| 1,268,222 A * | 6/1918 | Dwyer | 242/419.5 |
| 1,790,680 A | 2/1931 | Sherman et al. | |
| 2,099,314 A | 11/1937 | Potdevin | |
| 2,344,720 A | 3/1944 | O'Connell | |
| 2,513,093 A | 6/1950 | Hageman | |
| 2,538,425 A | 1/1951 | Nolan | |
| 2,618,336 A | 11/1952 | Davidson | |
| 2,800,180 A | 7/1957 | Jensen | |
| 3,036,751 A * | 5/1962 | Bartschi | 225/43 |
| 3,481,520 A | 12/1969 | Pickering | |
| 3,484,031 A | 12/1969 | Pine | |
| 3,666,151 A | 5/1972 | Dyer | |
| 3,672,551 A | 6/1972 | Peterson | 225/100 |
| 3,860,192 A * | 1/1975 | Morris | 242/421.5 |
| 3,888,399 A | 6/1975 | Roetter | |
| 3,987,949 A | 10/1976 | Manning et al. | |
| 4,022,364 A | 5/1977 | Davis | 225/100 |
| 4,025,023 A | 5/1977 | Moffit | |
| 4,222,511 A | 9/1980 | Schueler | 225/100 |

(Continued)

FOREIGN PATENT DOCUMENTS

EP    0480105    4/1992

(Continued)

OTHER PUBLICATIONS

European Search Report—Appln. No. EP 01 30 5552.

*Primary Examiner*—John Q. Nguyen
*Assistant Examiner*—Sang Kim
(74) *Attorney, Agent, or Firm*—Alston & Bird LLP (57) ABSTRACT

The present invention is a laminate media, in the form of a continuous strip of carrier-less, pre-cut plastic patch protections, connected by perforations. The invention further describes both a method for separating the patches from each other by stressing the perforated patch area without stopping the driving process and a cassette within which the separation process occurs.

22 Claims, 10 Drawing Sheets

U.S. PATENT DOCUMENTS

| | | | |
|---|---|---|---|
| 4,261,497 A | 4/1981 | Roetter et al. | |
| 4,284,221 A | 8/1981 | Nagel et al. | |
| 4,375,189 A | 3/1983 | Berner et al. | |
| 4,688,708 A | 8/1987 | Irvine et al. | |
| 4,690,344 A * | 9/1987 | Yokota | 242/564.1 |
| 4,982,337 A | 1/1991 | Burr et al. | |
| 4,997,119 A | 3/1991 | Meschi | 225/100 |
| 5,079,901 A | 1/1992 | Kotsiopoulos | |
| 5,141,142 A | 8/1992 | Ramsey | |
| 5,230,453 A * | 7/1993 | Meschi | 225/100 |
| 5,362,008 A * | 11/1994 | Nagel et al. | 242/417 |
| 5,388,746 A | 2/1995 | Hatchell et al. | |
| 5,526,973 A * | 6/1996 | Boone et al. | 225/34 |
| 5,540,369 A | 7/1996 | Boreali et al. | |
| 5,549,233 A | 8/1996 | Clauser | |
| 5,584,962 A * | 12/1996 | Bradshaw et al. | 156/495 |
| 5,783,024 A | 7/1998 | Forkert | |
| 5,803,261 A | 9/1998 | Nowakowski et al. | |
| 5,806,993 A * | 9/1998 | Petterutti et al. | 400/88 |
| 5,836,498 A | 11/1998 | Turek | 225/1 |
| 5,860,753 A * | 1/1999 | Beck et al. | 400/692 |
| 5,862,968 A | 1/1999 | Traise | |
| 6,004,053 A * | 12/1999 | Petteruti et al. | 400/693 |
| 6,019,865 A | 2/2000 | Palmer et al. | |
| 6,082,079 A | 7/2000 | Kuehl et al. | |
| 6,149,045 A * | 11/2000 | Kadono | 226/196.1 |
| 6,196,493 B1 * | 3/2001 | Tanaka | 242/564.4 |
| 6,206,262 B1 | 3/2001 | Achelpohl et al. | |
| 6,257,475 B1 | 7/2001 | Ishii et al. | 225/100 |
| 6,431,492 B1 * | 8/2002 | Chillscyzn | 242/577 |
| 6,609,844 B1 * | 8/2003 | Petteruti et al. | 400/88 |
| 6,659,603 B2 * | 12/2003 | Kida et al. | 347/104 |
| 6,712,463 B2 * | 3/2004 | Matsumoto | 347/104 |
| 6,896,432 B2 * | 5/2005 | Ohyama | 400/642 |
| 2002/0117528 A1 | 8/2002 | Turek | 225/4 |
| 2003/0000637 A1 | 1/2003 | Campion et al. | |
| 2005/0067773 A1* | 3/2005 | Yoshida et al. | 271/264 |

FOREIGN PATENT DOCUMENTS

| | | |
|---|---|---|
| EP | 1 247 643 A2 | 10/2002 |
| FR | 1.106.023 | 12/1955 |
| JP | 06001514 | 1/1994 |
| JP | 06001514 A * | 1/1994 |
| JP | 2002312752 | 10/2002 |
| NL | 7806356 | 12/1979 |
| WO | PCT/US99/26059 | 5/2000 |
| WO | WO 00/27634 A | 5/2000 |

* cited by examiner

STRIP DRIVING DIRECTION →

FIG. 9

STRIP DRIVING DIRECTION →

CARRIER-LESS PATCH PROTECTION INCLUDING CASSETTE AND SEPARATION DEVICE

CROSS-REFERENCE TO RELATED APPLICATIONS

The present application is a divisional of abandoned U.S. patent application Ser. No. 09/827,646 filed on Apr. 6, 2001 now abandoned and claims priority therefrom. U.S. patent application Ser. Nos. 10/328,287 and 10/328,155 both filed on Dec. 23, 2002 are also divisionals of the Ser. No. 09/827,646 application and are abandoned.

FIELD OF THE INVENTION

The invention pertains to carrier-less (liner-less/web-less), precut perforated plastic protections (patches) that lay on one or both sides of a card, the process of separating the patches from each other without stopping the driving process, and a cassette within which the separation process occurs. More particularly the invention pertains to a configuration of laminate media for printer technology that permits a quick and waste-less lamination operation. The carrier-less, precut, perforated patches allow for the preservation of accurate dimensions of the patch. The separation process and cassette require minimal maintenance by the operator and is a more cost-effective technology because there is no need for a cutter within the printer or laminator.

BRIEF DESCRIPTION OF THE RELATED ART

The word "patch" designates a plastic, or other material, layer added to a plastic card to increase the card's resistance to forgery and increase the durability of the card and the print thereon.

One of the most common methods to make a card secure is to put a patch on the card. Once the card has been protected with a patch, no printed information can be changed or the patch taken off without damaging the card.

Different kinds of security elements can be placed on the patch to protect a card. For example, a visual, overt or covert feature such as a hologram may be imprinted on the patch prior to being laminated onto the card.

The patch maintains the card's quality by protecting the colors of the dye sublimation or thermal transfer printing on the card from ultraviolet rays and the card itself against abrasions.

Prior art patches are usually made of thin polyester or PVC (polyvinyl chloride) provided by the manufacturer in a common patch thickness from 0.1 to 30 mil.

Figure 1:
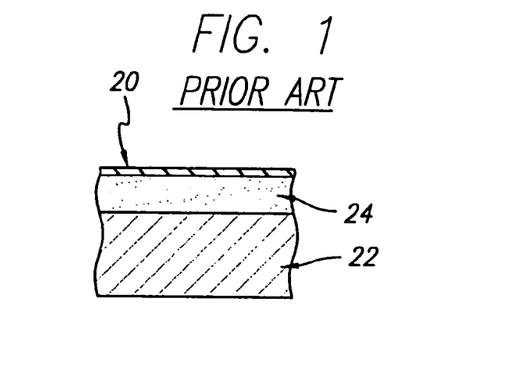
FIG. 1 is a cross-sectional elevational view of a prior art protected card.

Temperature-activated glue 20 is commonly placed on one side of a patch 24 to permit the adhesion of the patch 24 onto the card 22. (See FIG. 1). The glue 20 can be an acrylic or vinylic base for a patch made of a polyester base and a card made of PVC, ABS or composite.

Figure 2:
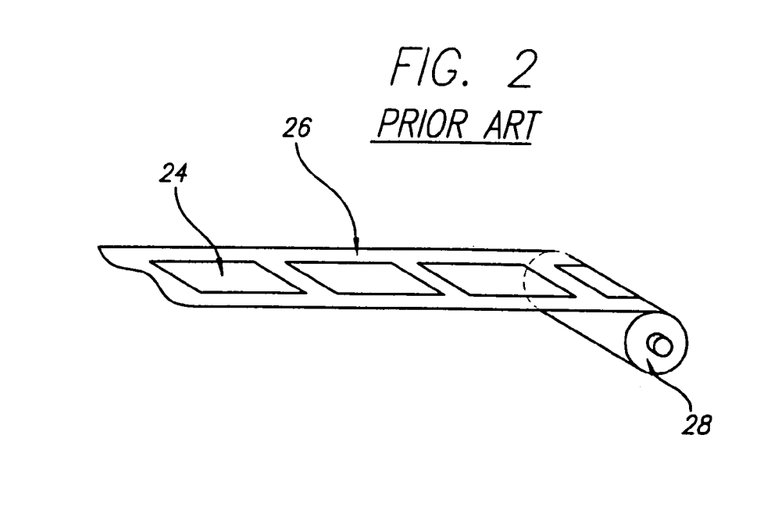
FIG. 2 is a perspective view of prior art patches carried on a carrier and wound around a conventional spool.

The flexible patches 24 are normally affixed onto a carrier or web 26 and provided as a ribbon. (See FIG. 2). The term "ribbon" as used herein is meant to encompass any type of printer technology that employs a flat, linear material wound around a spool. An acrylic or vinylic-based glue (not shown) is placed between the carrier 26 and the patch 24, on the side of the patch 24 that will not come into contact with the card 22. This temperature-activated glue is heated to allow the separation of the patch 24 from the carrier 26 before it comes into contact with the card 22.

The carrier 26 and patches 24 are usually supplied on a supply spool 28 that is driven by a take-up spool 30. (See FIG. 3). The patch 24 is removed from the carrier 26 during a lamination process 32, and the carrier 26, without the patch 24 is then wound around the take-up spool 30. Since replaceability is a requirement for lamination ribbon, most printers that use a ribbon mounted on spools are designed so that the operator can replace the spool. Spools are also called "cores" and ribbon/spool combinations can be sold as a single item. Typically, each spool is mounted on a spindle 34 for operation, the spindles being generally cylindrical in shape and attached to a motor-operated assembly that controls the rotation of the spool. In most cases, only the take-up spool 30 is controlled, while the supply spool 28 is allowed to rotate freely as ribbon is removed from the supply spool 28 by the force exerted on the ribbon by the take-up spool 30.

Figure 3:
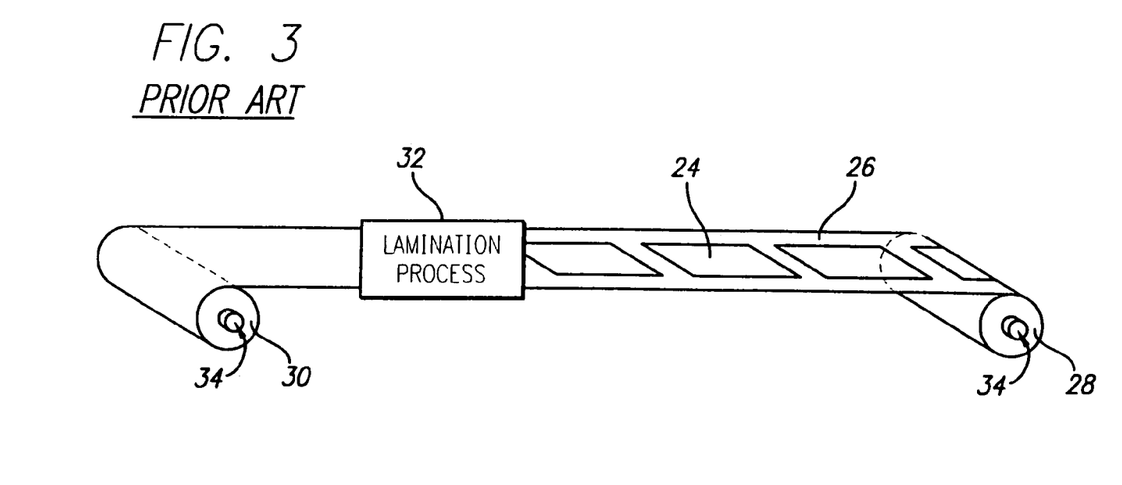
FIG. 3 is a schematic of the driving process of prior art patches using a carrier.

The process of laminating the card with the patch consists of bringing the front edge of the patch 24, driven by the take-up spool 30, in contact with the front edge of the plastic card 22. An optical sensor (not shown) on the printer usually detects a position mark placed on the carrier 26 to synchronize the patch 24 with the card 22.

In the lamination process, a heater roller (not shown) then presses the patch 24 onto the card 22 using pressure and a chemical application process. For example, the temperature of the heater roller heats the card surface to 110 degrees Celsius and applies a pressure of 4 Kg. This pressure and temperature make the glue between the carrier 26 and the patch 24 deactivate, allowing the patch 24 to be removed from the carrier 26. The glue 20 on the other side of the patch then becomes active when coming in contact with the card. This process is referred to as "lamination."

The card 22 can be printed first and then laminated. The printing can also be executed onto the patch 24 itself so that the printed surface would be on the side of the patch 24 that comes in contact with the card 22 after lamination. In that case, the adhesive is applied on the card 22 or on the patch 24 after printing, which necessitates an extra operation before lamination.

The patches 24 on a carrier 26, provided by the vendor, can be cut to fit the full size of the card 22, or part of the card 22, to avoid an area for a smart chip, an encoding stripe or any other desired pattern.

Alternatively, cutters in the printer or laminator may be used to cut a continuous strip of unperforated, carrier-less patches into any particular size, or after lamination the card and patch can be cut according to any dimension using a cutter tool in the printer.

The patch 24 on a carrier 26 represents a high cost media because it requires many operations in the ribbon manufacturing process. Moreover, the carrier 26 takes up a considerable amount of space on the supply spool 28 and necessitates a take up spool 30 to support the carrier 26 after the patch 24 has been removed. Further, using a carrier yields fewer patches 24 per length of ribbon strip due to the space or gap between each patch along a carrier. Therefore, an operator is required to perform more loading operations of supply and take up spools 28, 30 into the printer or laminator, which creates more down time.

The printer or laminator also requires extra power to activate the adhesive on the patch 24 through the carrier 26 and to separate the patch 24 from the carrier 26. Harmful smoke may result from this operation and disturb the operator.

Also, the reliability of cutter tools in the printer or laminator is not precise in terms of repeatability.

Each cutter only allows one cut format. To permit a flexible use of different patch formats, a number of extra cutters would be needed in the printer or laminator.

Dull cutter tools may need to be replaced, necessitating supplementary maintenance by the operator or requiring after sales service.

Using either a carrier cut to specified dimensions prior to use or a cutter inside a printer or laminator to finalize the patch dimensions create a waste of material. The waste is either the cut patch parts or the carrier itself. Additional locations in the printer are needed to receive the tools to cut, drive and store the rejected material.

The main problems with the prior art are evident by the use of a carrier that needs to be driven and stocked, or by unperforated carrier-less patches that need to be cut with cutters to finalize the card dimensions. These processes do not represent a reliable or flexible technology; they necessitate extra expense, frequent user intervention and also generate maintenance problems. The present invention overcomes the problems inherent in the prior art.

SUMMARY OF THE INVENTION

The preceding and other shortcomings of the prior art are addressed and overcome by various aspects of the present invention.

The present invention relates to a continuous strip of unsupported media, precut and forming patches connected by perforations. The present invention also relates to a separation process used to separate the patch from the continuous strip and a laminate cassette to house the media.

The foregoing and additional features and advantages of the present invention will become apparent by way of non-limitative examples shown in the accompanying drawings and the detailed description that follows. In the figures and written description, numerals indicate the various features of the invention, like numerals referring to like features throughout both the drawing figures and the written description.

BRIEF DESCRIPTION OF THE DRAWINGS

The invention is shown by way of example in the accompanying drawings in which.

DETAILED DESCRIPTION

The present invention is a new and improved carrier-less (liner-less/web-less) pre-cut, perforated, plastic protection (patch), a method for separating the patches from each other, and a laminate cassette to house the media.

The present invention does not require position markers, as there is no space between the patches. This advantage creates a waste-less process.

In the first embodiment, perforated, carrier-less media is wound on spools. The media is adapted to be transported through two pairs of adjacent rollers that are used to separate a unit of media from the continuous strip of media by creating a stress on the perforations.

The embodiment described will refer to 1 mil. patches, although other patch thicknesses are available. Further, the invention can easily be adapted to other card and patch thicknesses by persons of ordinary skill in the art.

The size of the patch (width, length, corner radius and thickness) can be defined according to the dimensions of the card used by a customer and the required level of protection. For example, when using ISO (International Standardization Organization) cards, the patch can be 85 mm by 54 mm.

Examples of cards using patches are driver's licenses, high security identification badges and tags, student identifications, national identifications, and secure facility access control cards.

Figure 4:
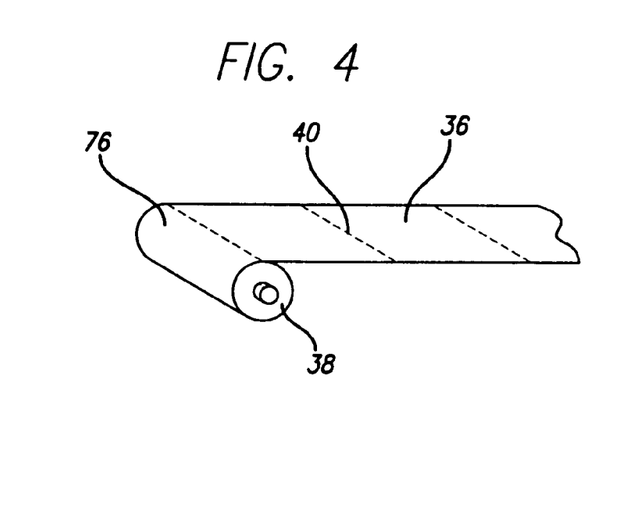
FIG. 4 is a perspective view of perforated and carrier-less patches wound around a conventional spool.
Figure 5:
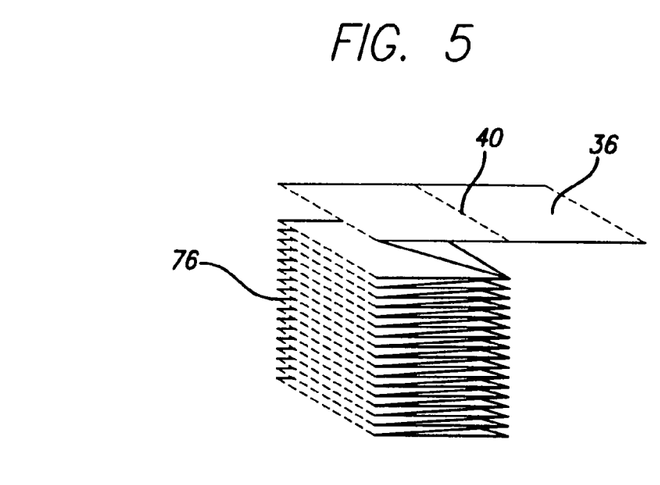
FIG. 5 is a perspective view of perforated and carrier-less patches stacked in accordion fashion.

FIG. 4 is a perspective view of a continuous strip 76 of pre-cut, carrier-less patches 36 having perforations 40 and wound to create a conventional spool 38. FIG. 5 is a perspective view of the continuous strip 76 of pre-cut, carrier-less patches 36 having perforations 40 and stacked in accordion fashion. Both FIGS. 4 and 5 show the perforations 40 existing on two ends of each patch 36, connecting each patch 36 to the next patch 36 in the strip 76.

The patches 36 can both be perforated and linked on either their width or their length. The distance between each perforation between the patches 36 is defined according to the fragility of the ribbon strip 76 material and to achieve the same separation force irrespective of the dimensions of the patch 36. For example, when the width of the patch is 54 mm, the configuration of the perforation can be 1 mm tie for 4 mm cut. This means that when looking at a perforated edge of a patch, there are a series of 4 mm cut spaces and of 1 mm connected areas that attach one patch to the next patch. The cuts or perforations are parallel to an edge of the patch 36.

Figure 6:
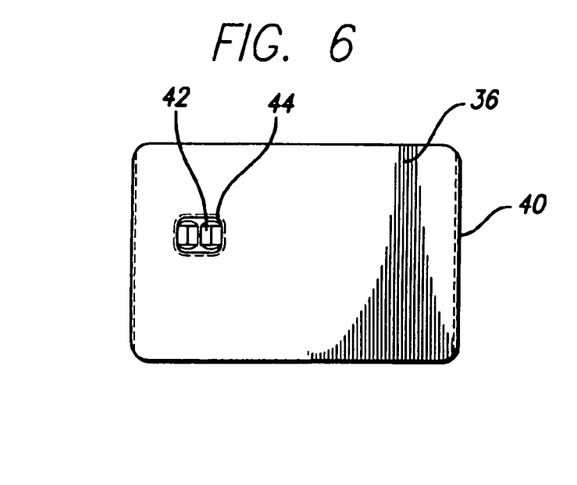
FIG. 6 is a plan view of a plastic card laminated with a full size patch having a precut space for a smart chip.
Figure 7:
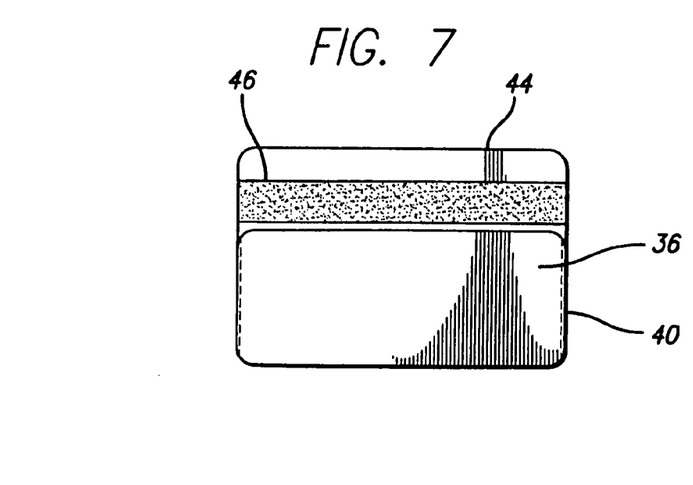
FIG. 7 is a plan view of a plastic card laminated with a patch avoiding the area for an encoding stripe.

FIGS. 6 and 7 show different sized patches. FIG. 6 shows a patch 36 having a cutout 42 to allow a smart-chip to be placed on a card 44 without being covered by the patch 36. FIG. 7 shows a patch narrower than a full-size card 44 so that the patch 36 does not cover a magnetic strip 46 on the card 44. Different types of patches include, but are not limited to: clear full card; clear with magnetic stripe allowance; clear with signature matte; custom holograms; clear with smart chip allowance; and custom OVI (optically variable ink).

In a preferred embodiment the plastic patches are made of polyester or PVC. Temperature-activated glue is then placed on one side to permit the adhesion of the patch to the card.

The preferred glue is acrylic and vinylic based, and activated when the card surface reaches around 110 degrees Centigrade. The activation temperature is reached when the patch is placed under a heater roller for lamination.

In a preferred embodiment the patches are driven and separated by two drive rollers rotating with different speeds to create a stress on the perforated area. By allowing the patches to separate without stopping the driving process, this invention is more efficient.

Figure 8:
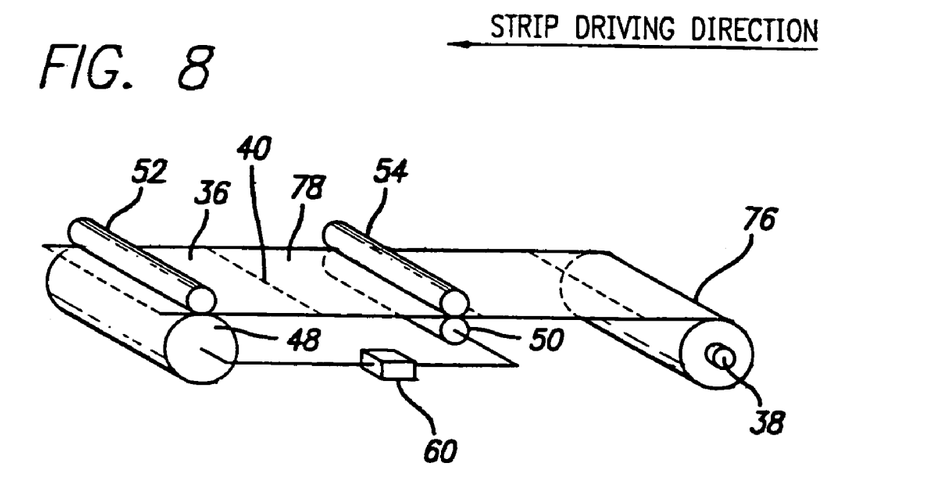
FIG. 8 is a schematic of a first patch separation process.

FIG. 8 shows a first embodiment having a first set of rollers comprising upstream drive roller 50 and pressure roller 54 and a second set of rollers comprising downstream drive roller 48 and pressure roller 52. The drive rollers 48,50 are driven by one motor 60 (or two driving systems having the same speed). In this first embodiment the diameter of drive roller 48 is greater than the diameter of drive roller 50. For example, if the diameter of drive roller 48 is 20 mm, then the diameter of drive roller 50 is 8 mm in order to generate the appropriate tension force of 1 mm tie for 4 mm cut on the strip 76.

To separate a patch from the strip of patches, the printer or laminator provides a driving torque of 65 N•mm where the linear speed of drive roller 50 is 200 mm/min and the linear speed of drive roller 48 is 500 mm/min. Also, in order to avoid any unexpected separation of the patches, the 4 mm cut/1 mm tie patch configuration allows a rolling torque of the ribbon supplier of 26 N•mm.

The distance L between driving roller 48 and driving roller 50 must be equal to or longer than one patch length, but no longer than two patch lengths to ensure that only one perforation 40 is always located between the driving rollers 48,50. For example, if using an ISO card (85 mm by 54 mm), then the distance L can be 90 mm. If two or more patch lengths are located between the drive rollers 48, 50, then two or more perforated areas 40 are between drive rollers 48, 50 and no separation will occur. If less than one patch length is between the drive rollers 48,50, then a large traction force is exerted on patch 36 which may cause damage to the device.

In the preferred embodiment, patch 36 separates from the strip when the perforations 40 are between drive rollers 48, 50. Then the separated patch 36 is pulled and driven by drive roller 48, while the next patch 78, which is not separated from the strip yet, is pushed and driven by drive roller 50 to ensure that patch 78 is fed between drive roller 48 and pressure roller 52.

There are several ways to provide the greater linear speed required by drive roller 48. The following second, third and fourth embodiments are like the first embodiment with respect to the rollers, the required pressure for patch separation, and the direction the media travels. The second and third embodiments are like the first embodiment with respect to the distance L between drive roller 48 and drive roller 50.

The rollers 48, 50, 52, 54 may be made of rubber, silicon, polyurethane, or any other base with a hardness lower than 100 Shore A. The pressure of the two pressure rollers 52,54 is high enough so that there is the least amount of sliding possible between the driving rollers 48,50 and the strip of patches 76. For example, a 60 mm pressure roller will exert a force of 1 Kg across the entire length of the pressure roller.

Figure 9:
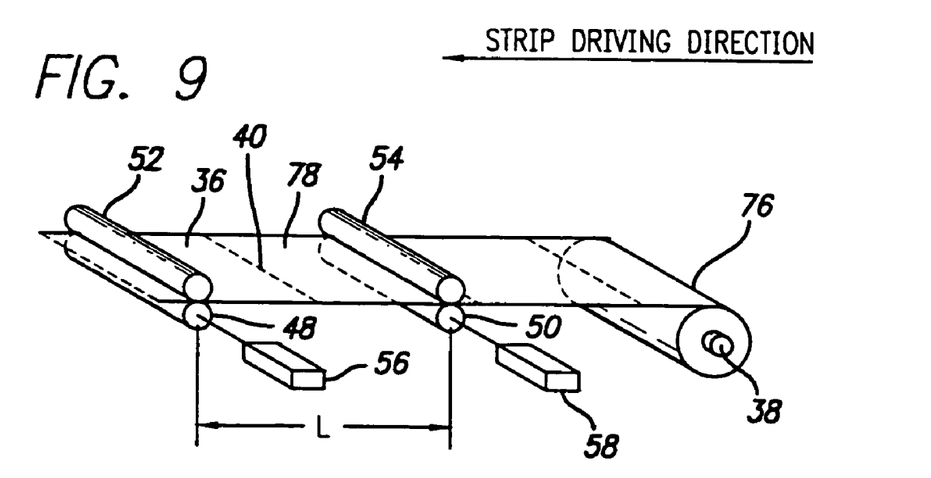
FIG. 9 is a schematic of a second patch separation process.

FIG. 9 shows a second embodiment of the separation process where the respective pressure rollers 52,54 exert a force on the strip 76 as the strip 76 travels from upstream drive roller 50 to downstream drive roller 48.

Motors 56, 58 drives drive rollers 48,50 respectively, generating two different speeds on the continuous strip of patches 36 between the sets of rollers. In this embodiment, the diameter of drive roller 48 is equal to the diameter of drive roller 50. The patch 36 travels between drive roller 50 and pressure roller 54 and then between drive roller 48 and pressure roller 52. The linear speed of drive roller 48 is higher than the speed of drive roller 50, which creates a tension force on the perforated area 40, and causes the adjacent patch 36 to separate at the perforation 40. For example, if the linear speed of drive roller 50 is 200 mm/min and the linear speed of drive roller 48 is 500 mm/min, then a tension force of 1 mm tie for 4 mm cut will cause the perforations 40 between the two sets of rollers to separate.

Figure 10:
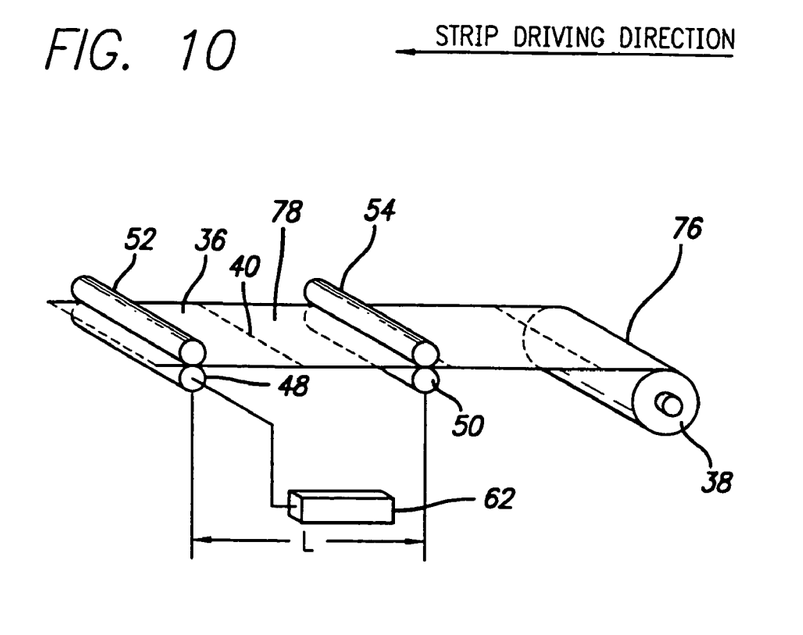
FIG. 10 is a schematic of a third patch separation process.

FIG. 10 shows a third embodiment where a translator device 62 is used to drive the downstream drive roller 48 50 that the linear speed generated by drive roller 48 is higher that the linear speed generated by drive roller 50 (combined movements), without using two motors.

The drive roller 48 can be activated by a translator device which can either be linked and driven by a cam or by a trammel and an endless screw. The translator is a device that drives movements. In this case we drive two movements, it moves the roller forward and backwards. For example, if the linear speed of drive roller 50 is 200 mm/min and the translation speed is 100 mm/min, then the linear speed of drive roller 15 is 400 mm/min.

Figure 11:
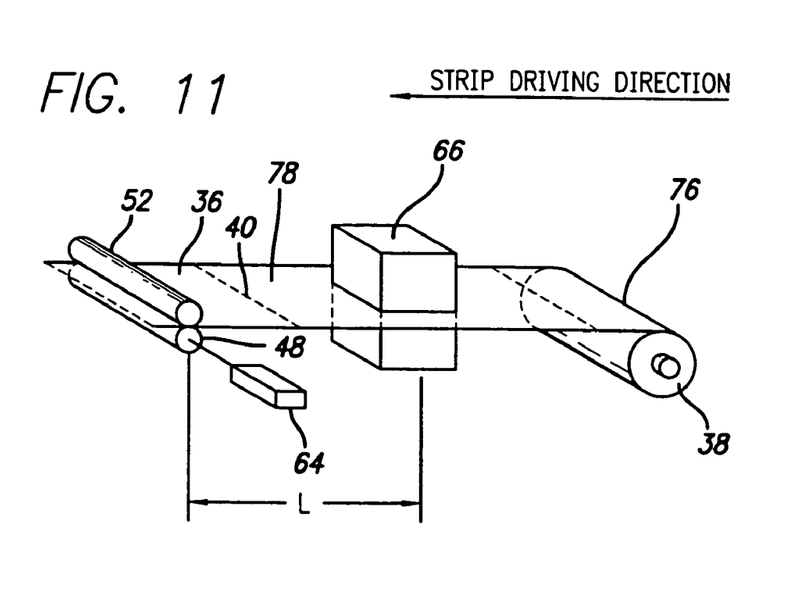
FIG. 11 is a schematic of a fourth patch separation process.

FIG. 11 shows a fourth embodiment using a static force to achieve different linear speeds. A tension force may be applied by downstream rollers 48, 52 on the first patch 36 while a static pinching device(s) 66 immobilizes the following patch 78. The force can be 350 g with a speed of 300 mm/min. The force and speed may be other values, but the values must take into account the fragility of the perforations on the patch. The distance L between drive roller 48 and pinching device(s) 66 must be longer than one patch, but no longer than two patch lengths, to ensure that a perforation 40 is always located between the drive roller 48 and pressure roller 52 and the pinching device 66. For example, if using an ISO card (85 mm by 54 mm), then the distance L can be 90 mm.

Figure 12:
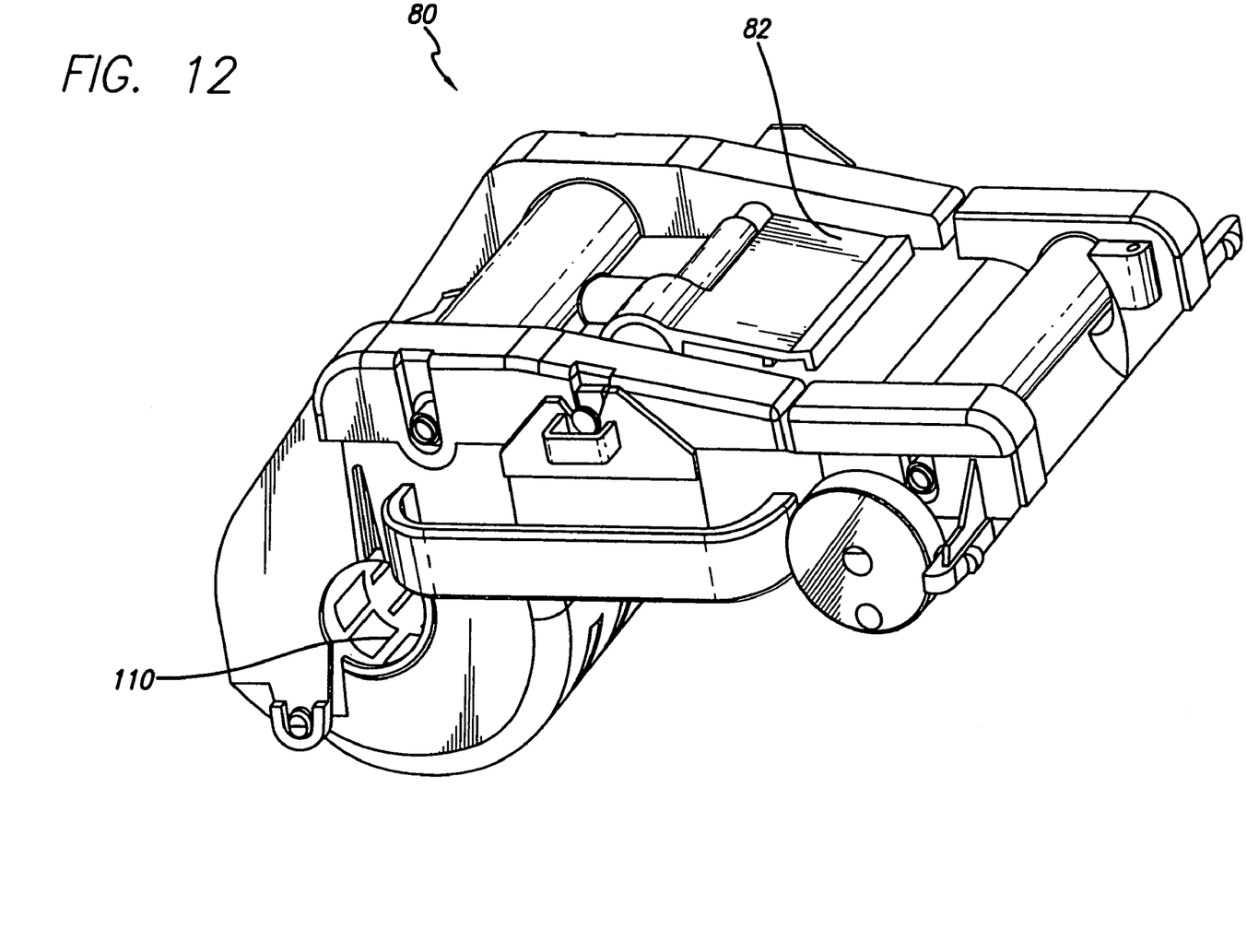
FIG. 12 is a schematic of the cassette loaded with media.

FIG. 12 shows a cassette 80 incorporating the embodiment disclosed in FIG. 8, although any of the disclosed separation processes may be incorporated into a cassette. The cassette in FIG. 12 shows a handle 82 to allow a customer access to the interior of the cassette 80. The cassette 80 can be stored or delivered to a customer separate from a printer or laminator. Customers may use one cassette for each different type of media. In the preferred embodiment, the cassette is made of molded plastic. The molded plastic is less expense than other materials, and allows the customer to receive a consumable cassette. As a consumable cassette, a user can store media within the cassette. The cassette may be made of alternative materials, either metallic or plastic, or a combination of several materials.

Figure 13:
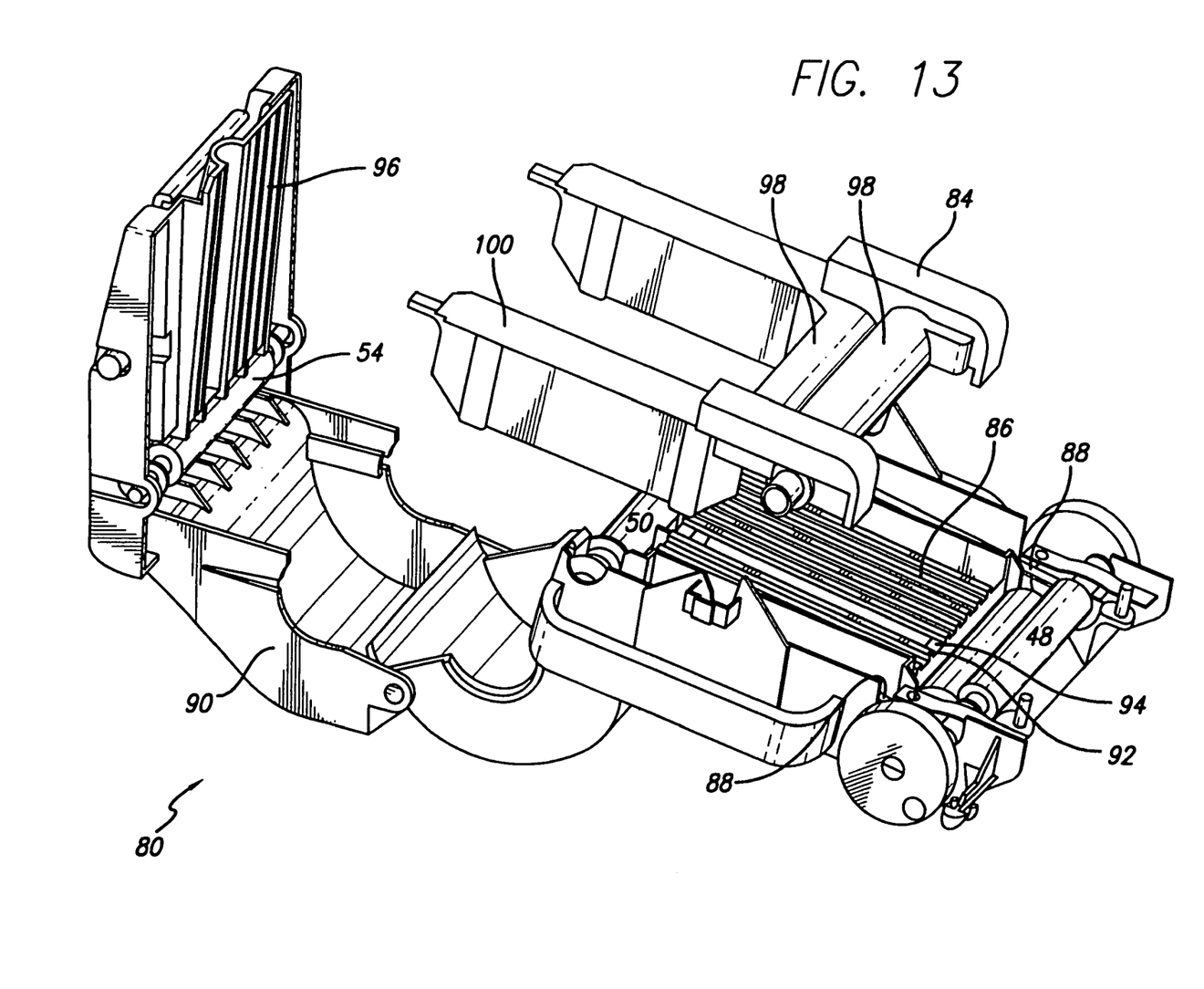
FIG. 13 is a schematic of the cassette with a roller casing removed.

FIG. 13 is the cassette 80 of FIG. 12 with the cover 90 open, and shows two belts 88 coupled to drive rollers 48, 50. The drive roller 48 has a greater diameter than drive roller 50. In the preferred embodiment, the motor 60 is coupled to drive roller 48 so that as drive roller 48 rotates, the belts 88 will enable drive roller 50 to rotate at the same speed as drive roller 48. Alternatively, the motor 60 could be coupled to the drive roller 50 so that as drive roller 50 rotates, the belts 88 will enable drive roller 48 to rotate. The belts 88 must be long enough to ensure that a perforation 40 is always between the drive rollers 48, 50 for proper patch separation. In the preferred embodiment, the distance between drive roller 48 and drive roller 50 is 90 mm. In the preferred embodiment, having two belts 88 allow high torque and resistance to fast changes in strength. However, one belt could be used, depending on its material and width.

Between drive roller 48 and drive roller 50 are ridges 86. The ridges 86 help guide the separated patch out of the cassette and also help feed the next patch between drive roller 48 and drive roller 50.

When few ridges are used, there are fewer contact points between the patch 36 and the ridges 86, thus the friction between the patch 36 and the ridges 86 is low. The appropriate number of ridges 86 are needed to ensure that the patches remain as flat as possible as the patch travels from the first set of rollers, drive roller 50 and pressure roller 54, to the second set of rollers, drive roller 48 and pressure roller 52. If too few ridges 86 are used, then a portion of the leading edge of the patch may bump against either drive roller 48 or pressure roller 52 instead of being driven between drive roller 48 and pressure roller 52.

In the preferred embodiment, the number of ridges 86 used allow 20 percent of the area of one side of the patch 36 to be contacted by the ridges 86.

A second set of ridges 96 is located between pressure roller 54 and pressure roller 52 in the cassette cover 90. The second set of ridges 96 perform the same functions as the first set of ridges 86 because the cassette is operable both right side up and upside down. The more flexible the media is, the smaller the distance between ridges 86 and ridges 96 must be when the cassette is closed to ensure the media remains flat and is fed between drive roller 48 and pressure roller 52. In the preferred embodiment, this distance is approximately 1 mm.

In the preferred embodiment, the number of ridges 96 used allow 20 percent of the area of one side of the patch 36 to be contacted by the ridges 96.

When a customer uses the handle 82 to open the cassette 80, the cassette cover 90 pivots open revealing the interior of the cassette 80. The cassette cover 90 houses pressure roller 54 and the second set of ridges 96.

A roller casing 84 houses pressure roller 52. The roller casing 84 is not detachable from the cassette 80 by a user. Many means of attaching the roller casing to the main body of the cassette may be used. In the preferred embodiment, the roller casing 84 is attached to the main body of the cassette 80 by screws (not shown), but clips or other known methods of attachment may be used. The roller casing 84 has one rounded cover 98 that covers the pressure roller 52. The roller casing 84 also has two arms 100 that cover the belts 88 when the roller casing 84 is attached to the cassette 80.

By enclosing the belts 88, drive roller 48 and pressure roller 52 with the roller casing 84, dust and debris from the belts 88 and pulleys (not shown) are prevented from interfering with the patch as it travels from the first set of rollers to the second set of rollers. By enclosing the media with the cover 90, dust and debris from the printer or laminator are prevented from interfering with the media.

Figure 14:
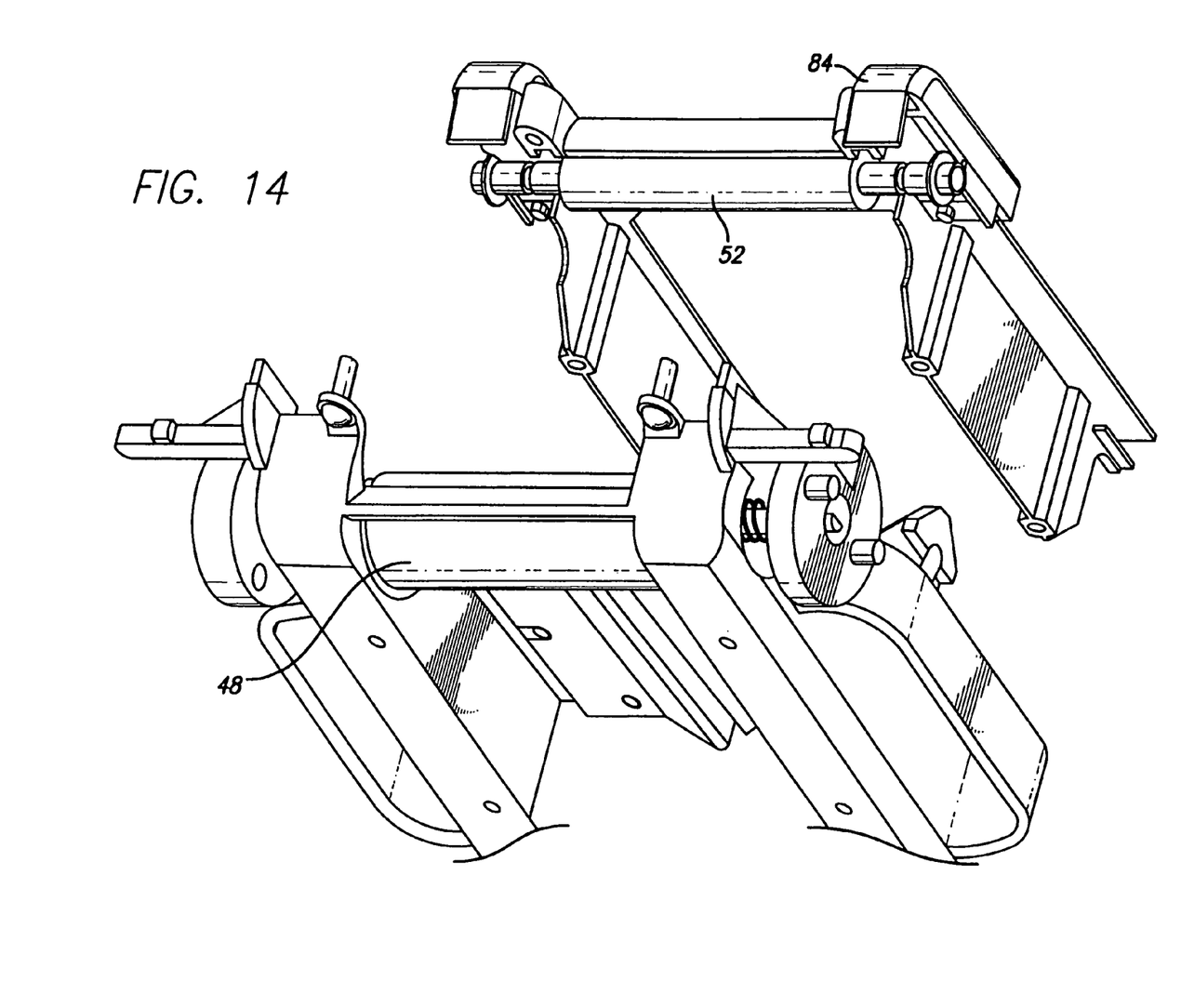
FIG. 14 is a schematic of the underside of the roller casing.

FIG. 14 shows the pressure roller 52 coupled to the underside of the roller casing 84. Drive roller 48 is coupled to the cassette 80 and pressure roller 52 is coupled to the roller casing 84 to ensure proper loading of the media. When the roller casing 84 is attached to the main body of the cassette 80, drive roller 48 and pressure roller 52 are offset from each other by approximately 45 degrees. Pressure roller 52 is offset forward of, or further downstream than, drive roller 48. The purpose of having the 45 degree offset is to ensure that the patch 36 exits from the cassette 80 at a 45 degree angle. Drive roller 48 and pressure roller 52 continue to drive the patch 36 as it exits the cassette 80. The 45 degree angle is necessary because other mechanisms within the printer using the cassette 80 require an entry angle of 45 degrees. Other printers may not require this offset because the mechanism that the patch 36 enters after exiting the cassette 80 may not require an entry angle of 45 degrees.

Another reason for the offset is to minimize the sliding between drive roller 48 and patch 36 by ensuring that the contact surface between drive roller 48 and patch 36 is large enough when a high driving torque is required to separate the patch 36 from the strip 76. In the preferred embodiment, no offset between driving roller 50 and pressure roller 54 is necessary.

Figure 15:
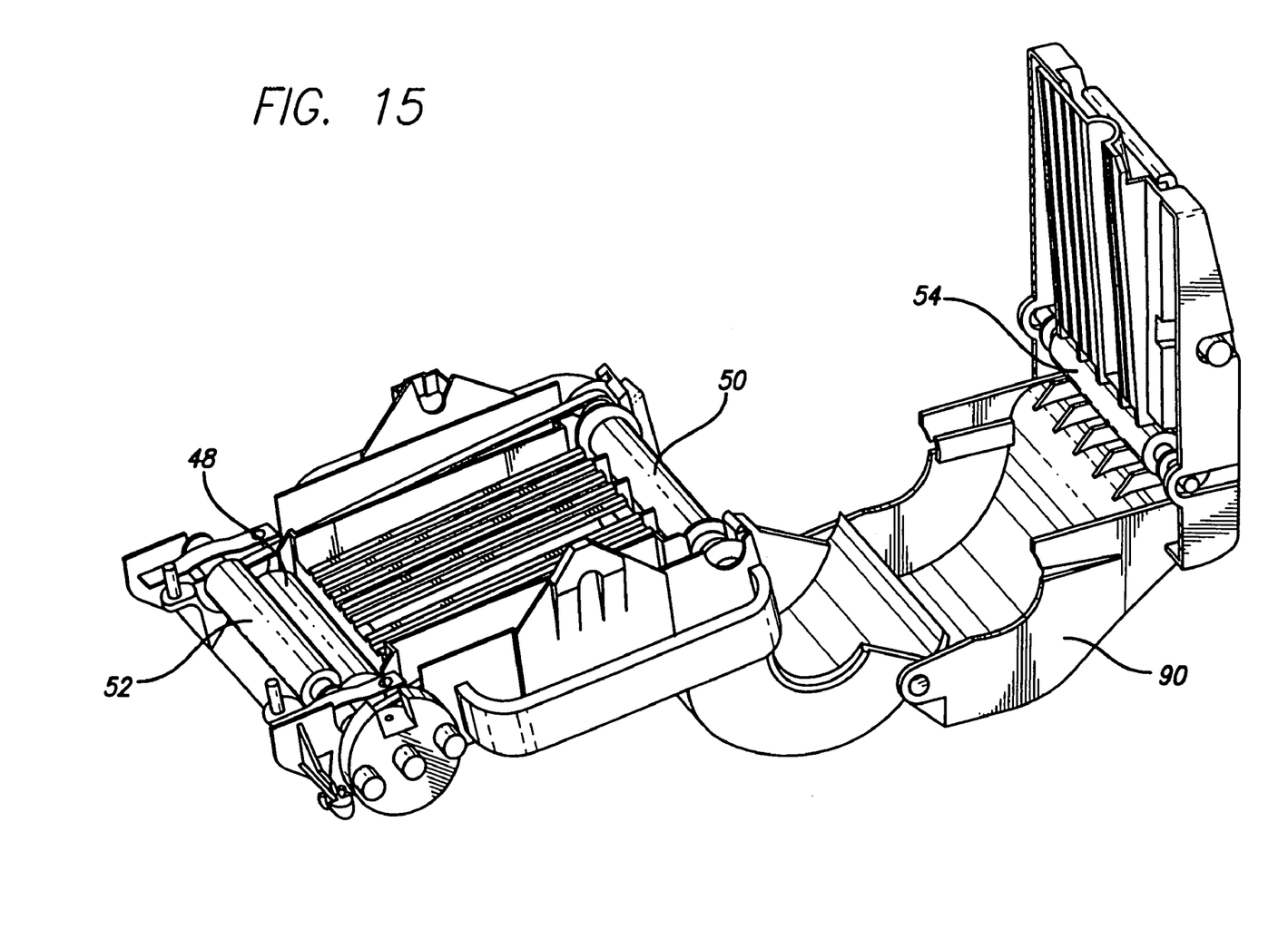
FIG. 15 is a schematic of the cassette with roller placement.

FIG. 15 shows the cassette 80 with the roller casing 84 removed to reveal how drive roller 48 and pressure roller 52 are offset from each other when the roller casing 84 is attached to the cassette 80.

Figure 16:
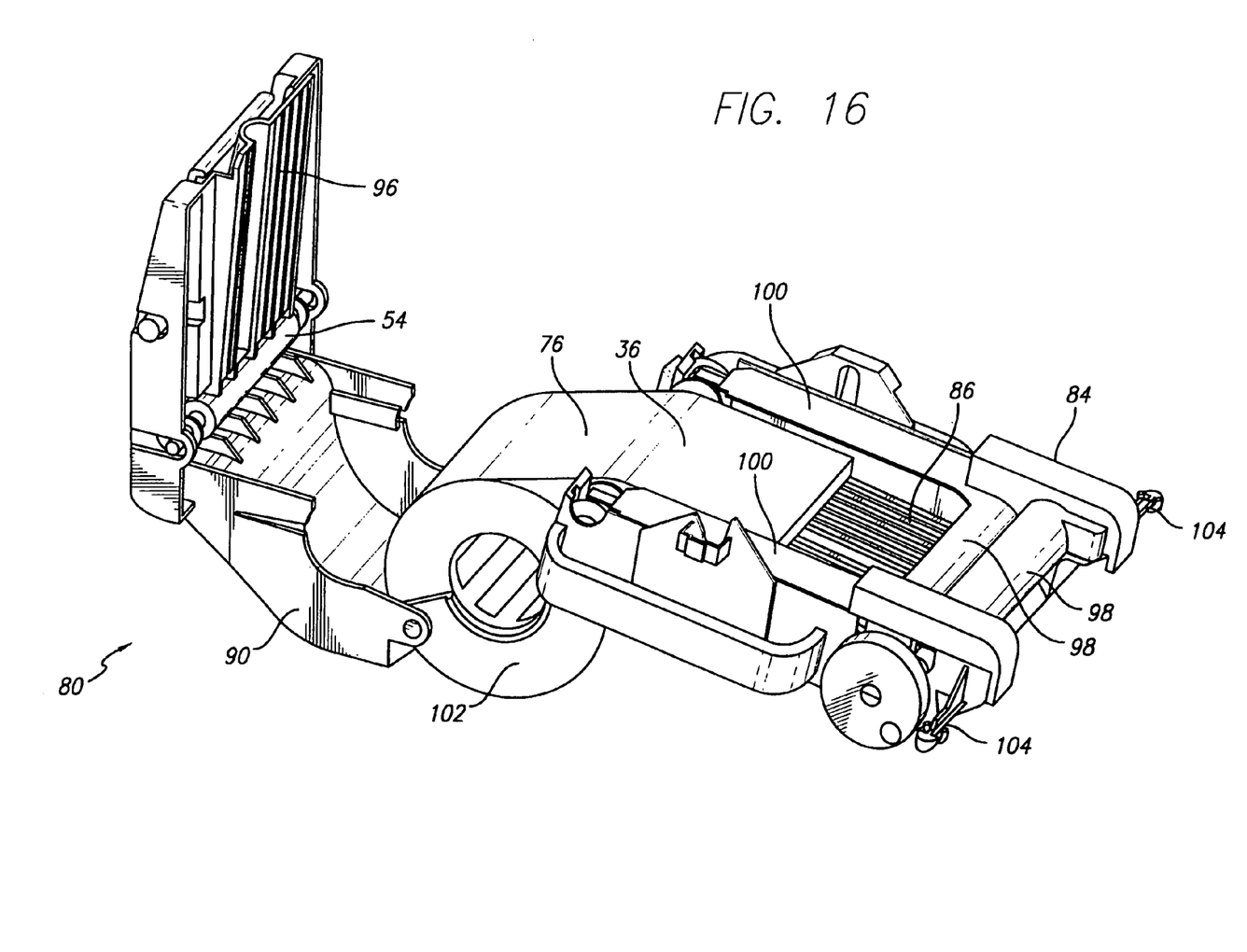
FIG. 16 is a schematic of the cassette with the cover opened and media loaded.

FIG. 16 shows how a customer loads media into the cassette 80. After the customer has opened the cassette 80 using the handle 82, the interior of the cassette is exposed. The roller casing 84 is still attached to the cassette 80. The customer loads a roll of perforated media into a media support 102. The media is then fed over drive roller 50. The customer then leaves the first patch 36 somewhere between drive roller 50 and drive roller 48, but does not feed the first patch 36 past drive roller 48.

If the customer fed the first patch 36 past drive roller 48, not only would the patch 36 be exiting the cassette 80 which would cause an interference with the other mechanisms in the printer, but the first patch 36 would not separate from the strip of media 76 because separation occurs within the cassette 80 and between drive roller 48 and drive roller 50.

After the customer has loaded the media, the cassette cover 90 must be closed before installing the cassette 80 into the printer.

Figure 17:
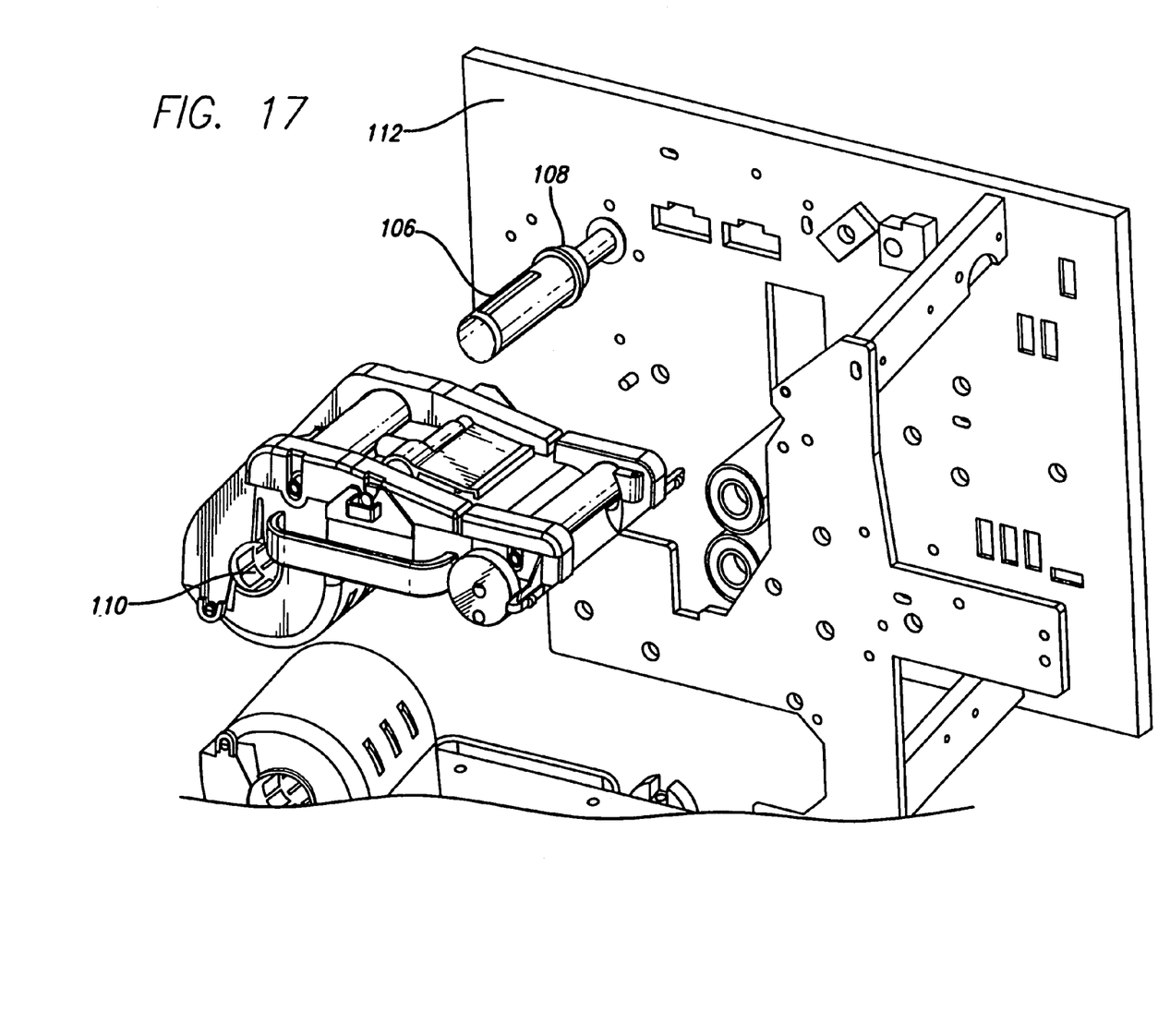
FIG. 17 is a schematic of the cassette and spindle.

FIG. 17 shows how the cassette 80 is mounted in the printer. In the preferred embodiment, there are no other special features to the spindle 106 other than a shoulder 108 that axially stops the position of the cassette 80. However, the spindle 106 may be conically shaped for ease of installing or have markings to ensure alignment.

When using the cassette 80 to laminate cards, the customer must install media 76 inside the cassette 80 first, because the cassette 80 is held in the printer or laminator through the core 110 of the cassette 80 which is also the core of the media roll 76. The media roll 76 can rotate freely in the cassette 80, but cannot move axially in the cassette 80. When installing the cassette 80 with the strip 76 inside, the core 110 is aligned with the spindle 106 of the printer or laminator, and slid onto it until the end of the core 110 comes in contact with the shoulder 108 of the spindle 106. Then, the customer cannot push the cassette 80 further, and the position of the cassette 80 is properly aligned.

A latching mechanism may be added between the cassette 80 and the printer, preferably, as far as possible from the spool area. The latching mechanism may be part of the molded cassette 80 and comprise two legs 104 having a spring effect. When the customer places the cassette 80 on the spindle 106 and pushes the cassette 80 toward the side wall 112, each of the two legs 104 will enter a hole (not shown) located on the side wall 112 of the printer. The diameter of the holes is small enough to put a stress on the two legs 104 as they are being inserted in to the holes and a customer will likely feel some resistance. Before the cassette 80 is completely installed in the printer, the two holes begin to have a larger diameter allowing the two legs 104 to relax as they continue in the holes. At the entrance the diameter of the hole is 9.2 mm. Then, 3 mm further in is a ring with a diameter of 8.2 mm. This ring is 2 mm width.

As soon as the end of the core 110 comes in contact with the shoulder 108 of the spindle 106, the customer feels the cassette 80 relax as the two legs 104 enter the two larger holes, then the cassette 80 is properly mounted in the printer.

The latching mechanism holds the cassette 80 in place with respect to the laminator or printer. The holding force created by the legs 104 of the latching mechanism is light enough so that removing the cassette 80 manually from the laminator or printer is easy. The easy installation and removal of the cassette 80 have been achieved by rounding the edges of the legs 104 of the latching mechanism so that they go in and out of the set of holes with a reasonable amount of resistance. Having the latching mechanism as far as possible from the core 110 allows for a better orientation of the cassette 80 in the laminator or printer, which guarantees that the separated patch will exit the cassette 80 in alignment with other guiding systems of the laminator or printer.

A radial spring loaded system may be implemented between the spindle and the core 110 to reduce vibrations within the cassette 80. It can be either attached to the spindle 106 or the core 110. In the preferred embodiment, a leaf spring (not shown) is attached to the spindle 106 to create a radial force on the core 110.

Other variants of the instant invention include, but are not limited to the following:

the patches can be linked together by perforations along more than two sides or just one side;

the patches can be fully separated by the use of a shear stress, such as a guillotine; and temperature-activated glue could be applied for the adhesion of both the printed matter and the patch onto the card or on the patch after printing.

What has been described is a new and improved carrierless, pre-cut, patch, a method for separating the patches from each other, and a removable cassette for the strip of patches overcoming most, if not all, of the disadvantages inherent in the prior art.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed is:

1. A cassette for use in a printer comprising:
   a body having a media holder;
   a first drive roller coupled at a first end of said body and adjacent to a media exit;
   a first pressure roller adapted to contact the first drive roller to thereby define a first set of rollers;
   a second drive roller coupled at a second end of said body adjacent the media holder;
   a door pivotally coupled to the body, the door being adapted to pivot between an open loading position and a closed operational position; and
   a second pressure roller coupled to the door and adapted to contact the second drive roller only when the door is in the closed operational position to thereby define a second set of rollers adjacent to the media holder;
   wherein the first drive roller and first pressure roller are spaced apart by a distance from said second drive roller and second pressure roller, and wherein said first drive roller rotates with a surface speed greater than that of the second drive roller and separates a leading patch entering the first set of rollers from a following patch exiting the second set of rollers.

2. The device of claim 1, the first pressure roller being adapted to contact the first drive roller at an offset from each other.

3. The device of claim 2, wherein the first pressure roller is adapted to contact the first drive roller at 45 degrees, downstream of a media flow, from the first drive roller.

4. The device of claim 1, wherein the first drive roller has a diameter greater than the second drive roller.

5. The device of claim 1, further comprising: at least one belt coupled to the first and second drive rollers; and at least one motor coupled to the first drive roller and adapted to drive the at least one belt and the second drive roller.

6. The device of claim 5, further comprising a roller casing having at least one arm to cover the at least one belt.

7. The device of claim 6, wherein the roller casing is adapted to be removably coupled to the body.

8. The device of claim 1, further comprising: at least one belt coupled to the first and second drive rollers; and at least one motor coupled to the second drive roller and adapted to drive the at least one belt and the first drive roller.

9. The device of claim 1, wherein the device is adapted to be operable in any orientation.

10. The device of claim 1, further comprising a handle coupled to a top of the door and being adapted to open and close the door.

11. The device of claim 1, wherein the door is adapted to create a core through a center of the media holder when the door is in the closed position.

12. A device comprising:
    a body having a media holder;
    a first drive roller coupled to said body;
    a first pressure roller adapted to contact the first drive roller to thereby define a first set of rollers;
    a second drive roller spaced apart from said first drive roller in said body;
    a door pivotally coupled to the body, the door being adapted to pivot between an open loading position and a closed operational position;
    a second pressure roller coupled to the door and adapted to contact the second drive roller when the door is in the closed operational position to thereby define a second set of rollers; and
    a first set of ridges coupled to the body between the first and second drive rollers and adapted to maintain a media substantially flat and to guide media from the second drive roller to the first drive roller.

13. The device of claim 12, wherein the first set of ridges are adapted to contact 20% of area of media as it passes over the first set of ridges.

14. The device of claim 12 further comprising a second set of ridges coupled to the door between an end of the door and the second pressure roller, the second set of ridges being adapted to maintain a media substantially flat position and to guide media from the second drive roller to the first drive roller when the door is closed.

15. A device comprising:
    a body having a media holder;
    a first drive roller coupled to said body;
    a first pressure roller adapted to contact the first drive roller to thereby define a first set of rollers;
    a second drive roller spaced apart from said first drive roller in said body;
    a door pivotally coupled to the body, the door being adapted to pivot between an open loading position and a closed operational position;
    a second pressure roller coupled to the door and adapted to contact the second drive roller when the door is in the closed operational position to thereby define a second set of rollers adjacent to the media holder; and a first set of ridges coupled to the door between an end of the door and the second pressure roller, the first set of ridges being adapted to maintain a media substantially flat position and to guide media from the second drive roller to the first drive roller when the door is closed.

16. The device of claim 15, wherein the second set of ridges are adapted to contact 20% of area of media as a media passes over the second set of ridges.

17. The device of claim 15 further comprising a second set of ridges coupled to the body between the first and second drive rollers and adapted to maintain a media substantially flat and to guide media from the second drive roller to the first drive roller.

18. A cassette device for transporting, separating and dispensing adhesive patches from a continuous perforated strip of patches each having a predetermined unit length (l) the cassette device being adapted to be coupled to a printer, laminator or other consuming device an comprising:
- a first drive roller,
- a first pressure roller adapted to contact the first drive roller to thereby define a first set of rollers,
- a second drive roller oriented parallel to and spaced from the second drive roller,
- a second pressure roller adapted to contact the second drive roller thereby define a second set of rollers separated from the first set of rollers by a distance (L), the distance (L) being greater than a length (l) of one patch, but not more than the combined length (2l) of two patches;
- a cassette body having a media holder,
- a first set of the guide ridges being formed on the cassette body facing a first side of the patches;
- a cassette cover pivotally coupled to the cassette body, the cover having an open loading position and a closed operational position; and
- a second set of the guide ridges formed on the cassette cover facing a second side of the patches, wherein the second drive roller rotates with a surface speed greater than that of the first drive roller to thereby separate a leading patch entering the first set of rollers from a following patch exiting the second set of rollers, the two set of ridges cooperate to define a media path for guiding the patches from the second set of rollers to the first set of rollers when the cassette cover is in its closed operational position; and the second pressure roller is coupled to the cover and is adapted to contact the second drive roller only when the cover is in the closed position.

19. The device of claim 18 wherein the continuous perforated strip of patches is supported by a hollow core inside the cassette body and the device further comprises a laminator spindle mounted independently of the cassette body, the spindle being insertable into the core and having a shoulder for maintaining the core in a predetermined position when the cassette is in its closed operational position.

20. The device of claim 18 further comprising a latch for maintaining the cassette in its closed operational position, and a handle facilitating insertion and removal of the cassette from said closed operational position.

21. The device of claim 18 wherein the guide ridges collectively make surface contact with at most 20% of the surface area of each adhesive patch.

22. The device of claim 18 wherein the second set of rollers defines an exit path that is offset from the guide path by an angel of about 45 degrees.

* * * * *